United States Patent [19]

Quick    BEST AVAILABLE COPY

[11] 3,996,918
[45] Dec. 14, 1976

[54] SOLAR ENERGY COLLECTOR UNIT

[76] Inventor: Melvin Randolph Quick, 889 Riffle Ave., Rahway, N.J. 07090

[22] Filed: July 19, 1974

[21] Appl. No.: 490,109

[52] U.S. Cl. .............................. 126/270; 220/23.4
[51] Int. Cl.² ........................................ F24J 3/02
[58] Field of Search .......... 126/270, 271; 237/1 A; 220/4 D, 23, 23.4; 217/42; 312/111; 165/143

[56] References Cited

UNITED STATES PATENTS

| | | | |
|---|---|---|---|
| 888,611 | 5/1908 | Heinze, Jr. | 220/23.4 |
| 2,680,437 | 6/1954 | Miller | 126/270 |
| 3,076,450 | 2/1963 | Gough et al. | 126/271 |
| 3,156,234 | 11/1964 | Steinberg | 126/270 |
| 3,554,384 | 1/1971 | DeNatale | 220/23.4 |
| 3,705,622 | 12/1972 | Schwarz | 165/143 |
| 3,916,871 | 11/1975 | Estes et al. | 126/271 |

FOREIGN PATENTS OR APPLICATIONS 762,759    9/1934    France .................. 126/271

Primary Examiner—Kenneth W. Sprague
Assistant Examiner—James C. Yeung

[57] ABSTRACT

A modular solar collector unit is arranged for symmetrical connection to other similar collectors to form a solar energy collection system. The individual units are arranged to be interlocked without special tools and without special know-how on the part of the person constructing the system. The units are adapted so that the heated air passes entirely internal to each solar collector unit through mating ports from one unit directly to the next unit.

6 Claims, 4 Drawing Figures

SOLAR ENERGY COLLECTOR UNIT

FIELD OF THE INVENTION

This invention relates to solar collector systems and more particularly to a solar collector unit adapted for connection to a number of other similar units to form an interlocked solar energy collector system where the heated air passes entirely within the individual system units.

Background of the Invention

Solar collector units are well known and consist of an enclosure for the entrapment of air to be heated; a dark (usually black) plate mounted within the box; and a top covering of at least one layer of glass. The space between the glass top and the black plate becomes heated due to the entrapment of the solar energy. The problem with such units as they exist today is that each system must be custom built to fit the particular need. Thus, if it is desired to construct a solar heating system on a roof of a house, a person skilled in construction, usually a carpenter, would be called upon to construct the framework on the roof. This construction would be typically made from wood with a glass covering. This is an expensive and time consuming method of construction and does not lend itself to being built by the typical homeowner. In fact, because of the weight of such systems they typically cannot be used on an existing house, without altering structure.

The solar collectors which come as individual light weight units are also not practical for home use since each unit is typically connected to the next unit by a series of pipes, each pipe being run exterior to the unit. In addition to the construction problems with such an arrangement there is the problem that exterior piping allows for an excessive heat loss which at the same time cuts down on the available surface area available for collecting the solar energy. Also, exterior piping suffers from an inability to carry the volume of air necessary for efficient use of solar energy.

An example of such a modular unit where external piping is used is the F. L. Suhay patent, U.S. Pat. No. 3,399,664 dated Sept. 3, 1968. In Suhay, the solar collector is used to heat water and exterior pipes are used to carry the water between each unit.

Accordingly, a need exists in the art for an easily constructable solar collector system, the individual units of which both provide for solar heating and for the transferring of the heated medium from one unit to the next adjacent unit.

A further need exists in the art for a solar collector unit having internal distribution of the heated medium, each such unit being easily connected to all adjacent units for the purpose of providing a solar collector system utilizing the maximum available surface area.

It is a basic object of my invention to provide for such a solar heating unit which satisfies these requirements while at the same time being light in weight, easily installed, highly efficient and also much cheaper in manufacture and installation.

Summary of the Invention

The above-discussed objects and others are achieved in accordance with one embodiment of my invention where a solar collector unit is constructed as a square box made from a light weight insulating material, such as foamed polyurethane or styrofoam, with a glass top. The top of the box is open and carries at least one pane of glass. Near the bottom of the box there is located a black metal plate. The area between the black plate and the glass top defines a cavity through which the air is to be heated flows. Solar energy is trapped between the glass top and the metal plate in the well-known manner as discussed in U.S. Pat. No. 3,215,134 issued to H. E. Thomason on Nov. 2, 1965, and as discussed in the above-mentioned Suhay patent.

An inlet port is formed in one side wall of the unit and an outlet port is formed in an opposite side wall. Air or any other medium to be heated passes into the unit through the inlet port and moves through the cavity between the metal plate and the top glass surface thereby becoming heated from the available solar energy. The heated air then moves through the outlet port and directly into the inlet port of the next adjacent abutting unit.

The inlet and outlet ports of the units are arranged for interlocking mating relationship with each other such that air seals between adjacent units are easily achievable.

On the side walls which do not contain inlet and outlet ports there are formed mating interlocks so that laterally placed next adjacent units can be interlocked in much the same manner as are adjacent boards in tongue and groove woodwork construction.

Accordingly, it is one feature of my invention to construct a solar heating collector unit having a square-shape with integral input and output ports where the input ports are arranged in mating relationship with the output ports of an adjacent unit.

It is a further feature of my invention that a solar heating collector is arranged so that all of the heated material flows within the units from one unit to the next through integral passages and where the passages are adapted for mating relationship with each other.

It is a further object of my invention to provide a system for the collection of solar energy where the heated medium passes entirely within the individual units of the collector system and where the energy entrapment portion of the system utilizes the maximum available surface area.

DESCRIPTION OF THE DRAWING

These objects and features of my invention, as well as others, will become more fully appreciated from a description of the drawing, in which.

DETAILED DESCRIPTION

Figure 1:
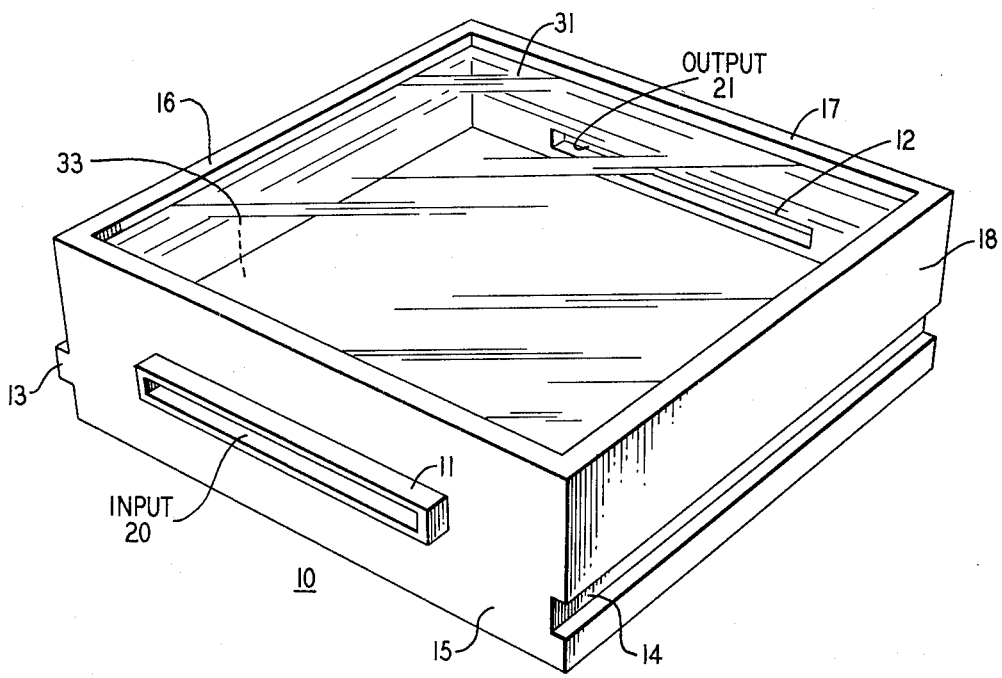
FIG. 1 shows a right side view of the solar collector having the input port on the left and the output port on the right.

As shown in FIG. 1, solar collector unit 10 is arranged in the form of a square within which is carried a glass top surface 31 and a metallic plate 33 which plate is mounted near the bottom of the square. In one side wall 15 of unit 10 an input port 20 is formed having lip 11. In the opposite side wall 17 there is formed an output port 21 having an opening just large enough to accept lip 11 in mating relationship. Air which is forced into unit 10 through port 20 passes between glass surface 31 and metal plate 33 thereby becoming heated from the available solar energy. The heated air is then forced out through port 21 and into a next adjacent unit 10. As will be shown, a number of such units can be interconnected together to form a matrix of units thereby covering the available surface area.

Each unit is also constructed having one side wall 18 with a groove therein and another side wall 16 with a lip 13 adapted to fit into groove 14. Thus, when the units are placed in abutting fashion the unit on the right has its lip 13 in mating relationship with unit 10, groove 14, while unit 10's lip 13 is in mating relationship with groove 13 of the unit next adjacent on the left. Accordingly, all of the units next adjacent unit 10 are mated with unit 10 in an interlocked fashion to form an easily constructable and rigid structure. For added support, an adhesive could be used on the mating parts to prevent any possibility of air leakage or movement. The entire structure can be easily attached to a roof or other surface by a small amount of adhesive under each unit. Since the units are light weight they can be mounted on top of the existing roofing material thereby protectng against water leakage into the building.

Figure 2:
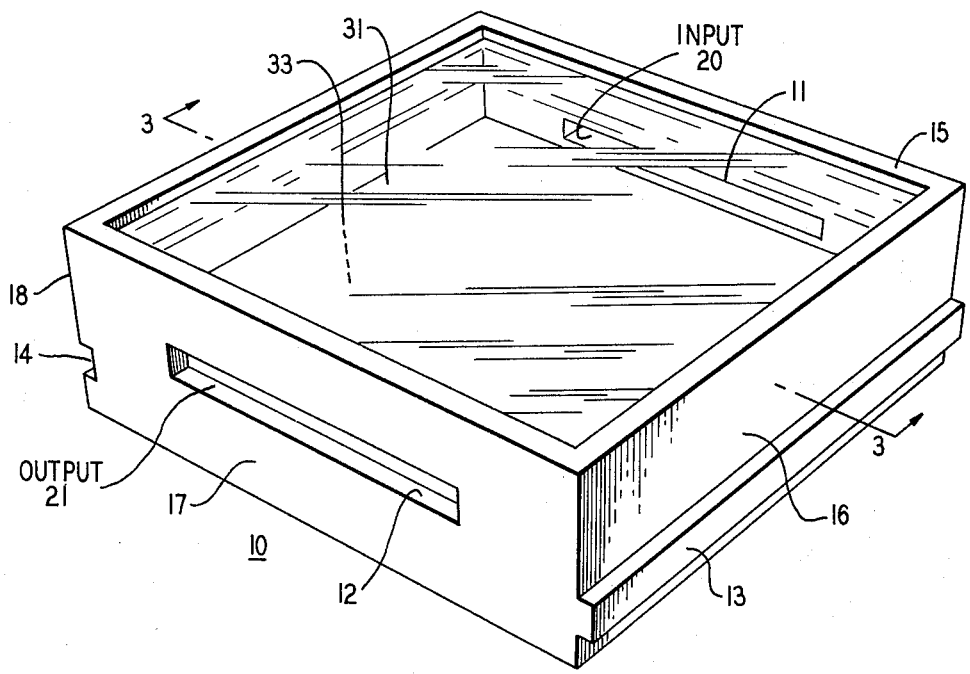
FIG. 2 shows a left side view of the same collector shown in FIG. 1 with the input port now on the right and the output port on the left.

In FIG. 2 unit 10 is shown reversed with the input port 20 now on the right and the output port 21 on the left. Of course, it will be noted that the unit works with air flow in either direction and the designation of one port as an input port and one port as an output port is only for convenience of discussion herein.

Figure 3:
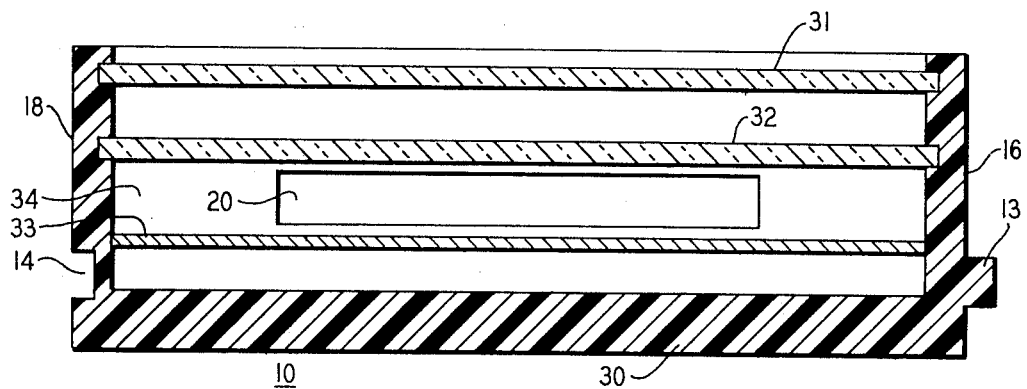
FIG. 3 shows a sectional view taken along section 3'3 of FIG. 2.

In FIG. 3 there is shown a cross-section view taken along section 3—3 of FIG. 2. Unit 10 is shown having sides 18 and 16. Side 18 has formed therein groove 14 while side 16 has formed thereon lip 13. The unit has bottom 30 above which is mounted black metal plate 33. Above plate 33 is a glass sheet 32 carried in grooves formed on the interior of unit 10. Above glass sheet 32 is a top glass sheet 31. The purpose of the double glass sheets is to increase the effectiveness of the solar collector by enhancing the entrapment of solar energy. This results since glass is opaque to heat waves, thereby cavity 34 formed between glass sheet 32 and plate 33 becomes heated from the sun's rays. The heated air in unit 10 gives off long rays of energy which do not pass through the glass. The lower layer of glass, sheet 32, provides a barrier to the radiation outward of heat and also acts as a thermal insulator by creating a dead space between glass sheets 31 and 32. However, it should be noted that only a single top sheet of glass or other athermanous mater need be provided. Air to be heated is forced, by a fan (not shown) into input port 11 directly into cavity 34. This air is heated by the energy trapped in cavity 34 and then continues out of the cavity via output port 12 and then directly into the energy cavity of a next adjacent unit. In this manner the air is heated as it passes through the individual units of the system. Since the units abut each other the warmed air is not allowed to cool between units.

Figure 4:
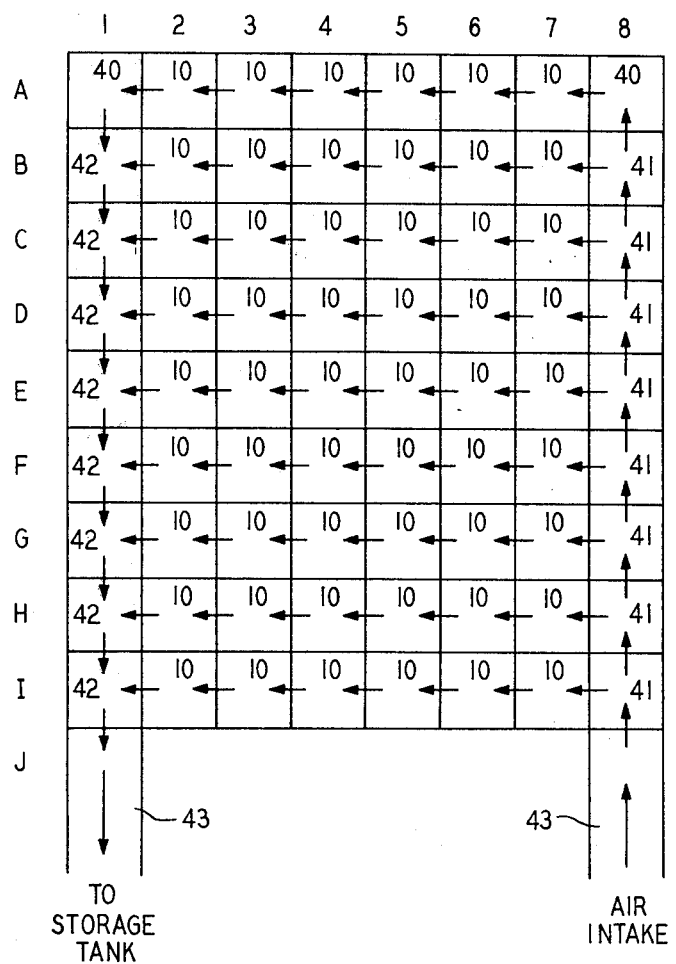
FIG. 4 shows in schematic form a system utilizing a number of individual units.

In FIG. 4 there is shown an entire system utilizing the concept of my invention. A number of individual units 10 are interconnected together to form a matrix of columns. For purposes of discussion the individual units of the system will be referred to by the intersection point on the grid formed by the rows labeled A–J and the columns labeled 1–8.

Air intake 43 which is located at grid position J8 can be a number of individual units 10 if it is mounted where solar energy is available. Air intake 43 can be constructed in the same manner as unit 10 with input and output ports except that a polystyrene top can be used instead of glass. However, since air intake 43 must pass a large volume of air the input and output ports are ideally made much larger than the regular size input and output ports of unit 10. For use at corners appropriate shapes can be made available, all having internal mating ports for the conducting of air. Distribution units 41 located at grid positions B8 and I8 are each constructed as a solar collector exactly as is unit 10 except that two output ports 21 are provided — one being larger than the other. One output port (the larger of the two) of unit 41 mates with the large input port of the next adjacent unit 41 and the other (regular size) output port mates with the next adjacent input port of unit 10. For example, looking at unit 41 at position H8 it will be seen that its large input port mates with the large output port of unit 41 at position I8. The larger one of its output ports mates with the large input port of unit 41 at position G8 while the regular size other one of its output ports mates with the input port of unit 10 at position H7.

Unit 40 at corner A8 is constructed having a large input port and a regular size output port on an adjacent side to mate with the units at positions B8 and A7, respectively. Unit 42 at position B1 is constructed having a large and regular size input port and a single large output port. Thus, by combining a number of different types of units, each constructed with internal passages and mating ports, an entire system can be constructed easily and without special tools or ability. By using half-sizes and curved sizes any number of system configurations can be achieved to cover the available surface area.

What is claimed is:
1. A solar energy collector unit comprising
a top portion, a plurality of side portions and a bottom portion,
a single cavity defined by said top, side and bottom portions said cavity adapted for the entrapment of said solar energy and for the passage therethrough of air to be heated by any said entraped solar energy in said cavity,
one of said side portions defining an output port through which said air to be heated may pass out of said entrapment cavity in contact with said defined output port, and
at least one other of said side portions defining an input port through which said air may pass into said entrapment cavity in contact with said defined input port, said input port having a shape adapted for mating relationship with an output port of a next adjacent one of said solar collector units, and
wherein a third side portion of said solar collector unit defines a groove along an outside surface thereof, said groove being parallel to said top and bottom portions, and wherein
a fourth side portion of said solar collector unit defines a lip along an outside surface thereof, said lip being parallel to said top and bottom portions and adapted for mating relationship with a groove of a next adjacent one of said solar collector units.

2. The invention set forth in claim 1 wherein said input port shape is a lip extending outward from said side and wherein said output port is an opening shaped to receive said input port lip of said next adjacent one of said solar collector units.

3. A solar energy collector system comprising a plurality of individual solar energy collector units, arranged into columns, each said unit being self-contained for the entrapment of solar energy and each said unit defining a cavity through which air to be heated by said trapped solar energy can be moved, each unit further comprising
   interconnecting means for connecting said cavities of all said units in a column of said units, said interconnecting means including an input port and an output port integral with said unit where said input port of one said unit is adapted for direct mating relationship with said output port of a next adjacent one of said units in said column of units and where air moving through said ports is in direct contact with said integral input and output ports,
   means for interlocking each unit of a column with a unit in a next adjacent column in a manner such that said units of each adjacent column abut each other directly,
   wherein said input port is a lip extending outward from said unit and wherein said output port is an opening in said unit shaped to accept said lip, and
   wherein said interlocking means includes a groove formed in one exterior side of said unit and a lip formed in an opposite side of said unit, said lip and said groove arranged for mating relationship with the respective groove and lip of adjacent ones of said units.

4. The invention set forth in claim 3 wherein each said solar energy collector unit cavity is defined by a unitary structure having both structural rigidity and insulating properties.

5. The invention set forth in claim 4 wherein said unitary structure is foamed polyurethane.

6. A preformed solar energy collector unit arranged with a cavity for heating air, said cavity comprising
   an input port integral with said cavity and formed in a side portion thereof,
   an output port integral with said cavity and formed in a side portion thereof,
   said input port having a structure adopted for connection to said output port of another said preformed solar energy collector unit, said structure serving to pass said heated air from one solar collector unit to a mated collector unit and serving to mechanically maintain said mated collector units in a fixed relationship with respect to each other and wherein said cavity said input port and said output port are constructed from an insulating material,
   wherein said insulating material is preformed into a unitary structure defining said cavity and wherein said input and output ports define areas through which said passing air moves in contact with said formed input and output ports, said area being larger than could be formed by a circle through a side wall of said cavity, said collector unit having a top and a bottom portion, and
   wherein a third side portion of said solar collector unit defines a groove along an outside surface thereof, said groove being parallel to said top and bottom portions, and wherein
   a fourth side portion of said solar collector unit defines a lip along an outside surface thereof, said lip being parallel to said top and bottom portions and adapted for mating relationship with a groove of a next adjacent one of said solar collector units.

* * * * *